(12) United States Patent
Li et al.

(10) Patent No.: US 9,707,521 B2
(45) Date of Patent: Jul. 18, 2017

(54) AUTOMATED TEST APPARATUS FOR TESTING RISK AND INTEGRITY OF PHARMACEUTICAL FILTRATION MEMBRANES AND METHOD THEREOF

(71) Applicants:Ming-Hsin Li, Taoyuan County (TW); Shu-Pei Chiu, Taoyuan County (TW); Chih-Hsien Chang, Taoyuan County (TW); Te-Wei Lee, Taoyuan County (TW)

(72) Inventors: Ming-Hsin Li, Taoyuan County (TW); Shu-Pei Chiu, Taoyuan County (TW); Chih-Hsien Chang, Taoyuan County (TW); Te-Wei Lee, Taoyuan County (TW)

(73) Assignee: INSTITUTE OF NUCLEAR ENERGY RESEARCH, Jiaan Village, Longtan, Taoyuan (TW)

( * ) Notice: Subject to any disclaimer, the term of this patent is extended or adjusted under 35 U.S.C. 154(b) by 573 days.

(21) Appl. No.: 13/956,375

(22) Filed: Aug. 1, 2013

(65) Prior Publication Data

US 2015/0033828 A1 Feb. 5, 2015

(51) Int. Cl.
*B01D 65/10* (2006.01)
*G01M 3/06* (2006.01)

(52) U.S. Cl.
CPC .......... *B01D 65/102* (2013.01); *B01D 65/10* (2013.01); *G01M 3/06* (2013.01)

(58) Field of Classification Search
CPC ...... B01D 65/10; B01D 65/102; B01D 63/02; G01M 3/06; G01N 15/0826
USPC ............................................................ 73/38
See application file for complete search history.

*Primary Examiner* — Laura Martin
*Assistant Examiner* — Irving A Campbell

(57) ABSTRACT

An automated test apparatus for risk and integrity testing for pharmaceutical filtration membranes, including at least the following components: a liquid injection inlet, a pump, a fluid pressure gauge, a gas pressure gauge, a plurality of solenoid valves, a plurality of membranes, a gas pressure regulator valve, a pharmaceutical product bottle, and a bubble generation bottle. The automated test apparatus of the present invention is controlled by computer software in connection with an automatic pharmaceutical synthesis apparatus for automated testing. In use of the automated test apparatus of the present invention, it needs only to start the operating system of the automated test apparatus for membrane risk and integrity test after the completion of the automatic pharmaceutical synthesis. The membrane risk and integrity test can be accomplished in a short time by measuring pressures of gas and liquid with pressure gauges deposed online concurrently.

3 Claims, 3 Drawing Sheets

AUTOMATED TEST APPARATUS FOR TESTING RISK AND INTEGRITY OF PHARMACEUTICAL FILTRATION MEMBRANES AND METHOD THEREOF

BACKGROUND OF THE INVENTION

1. Field of the Invention

The present invention relates to an automated test apparatus for risk and integrity testing for pharmaceutical filtration membranes and method thereof, in particular relates to the risk and integrity testing for pharmaceutical filtration membranes for preparation of aseptic pharmaceutical production, and its isolated apparatuses.

2. Description of Related Art

Conventional methods of medicinal liquid filtration use a filter to exert pressure followed by a 0.2 μm membrane for filtration. The membrane needs to undergo an integrity test before and after the filtration to ensure the complete blocking of microorganisms in the medicinal liquid as a quality control standard before releasing the products. The European GMP (PIC/S GMP Annex 1, Article 113) requests that membranes used as a filter for aseptic medicine preparation should be sterilized and tested for its integrity before use, and should also be verified after use with an appropriate test method (for example, blistering testing, diffusion flow, or holding pressure testing).

Although a confirmation of membrane integrity prior to use may reduce filtrate waste. Nevertheless, the approach of filtration test (Pre-Use Post Sterilization Integrity Test, PUPSIT) is still controversial, and a test operation in any form may increase the risk of contamination to the membrane, and the use of pre-test of integrity is to enhance the chance of contamination to the membrane. Moreover, if it is really damaged the membrane, the integrity test after use can be performed and detected, it is unnecessarily that the integrity testing has to be done prior to use. The only consensus reached is to adopt a risk assessment approach to determine whether to perform PUPSIT.

Although the confirmation of membrane integrity before use may reduce filtrate waste, one of disadvantages of the conventional approach is that any operation for the membrane integrity testing is likely to increase the risk of contamination, and the integrity test before use is one that increased probability of membrane contamination.

Another drawback of the conventional approach is that after completion of radiopharmaceuticals labeling, the present filter integrity testing begins with manual operation, that not only has the problem of radioactive exposure, there are test reproducibility and accuracy of the process need to be improved. If the drawback in these issues receives no proper treatment, it may result in excessive exposure and test result accuracy shortcomings to occur.

U.S. Pat. No. 7,770,434 disclosed a method of medicine dispensing in-process integrity testing without dismantling filter membranes. However, it did not disclose a computer controlled automated integrity and risk testing for filter membrane, respectively, after and before filtration, and the outputs of filter membrane were not concurrently connected to bubble generating bottles and pharmaceutical product bottles, respectively.

In view of the above described drawbacks arising after the completion of radiopharmaceutical labeling during filter membranes integrity testing before and after filtering process, the inventors of the present invention are aiming for solving drawbacks in a way of continuous study and research and eventually this invention is presented.

SUMMARY OF THE INVENTION

The primary object of the present invention is to provide an automated test apparatus for risk and integrity testing of pharmaceutical filtration membranes that is operable by a computer automatic control system, for example, by measuring a bubble point pressure of the filter maximum aperture for a 0.2 μm membrane risk and integrity testing to ensure the effectiveness of the 0.2 μm membrane integrity in production and subsequent process. The present invention is applicable to the production of nuclear medicine injections for the treatment and diagnosis with PET (Positron Emission Tomography) and SPECT (Single Photon Emission Computed Tomography), as well as nuclear medicine industry research and development, other related biologics pharmaceutical manufacturing processes and applications.

Another object of the present invention is to provide an automated test apparatus for risk and integrity testing of pharmaceutical filtration membranes. It is to provide an integrated automated control system for membrane risk and integrity testing in place of traditional method that is dependent from other devices, or manual operation, or indirect proof of test result, and effectively prevent outside environment from polluting to pharmaceutical bottles. It is also an object of the present invention to reduce the pollution from manual operation and exposure radioactive dose to person's hand to mitigate the stringent requirements for environmental equipments, and adequately save the cost of production and investment while retaining production efficiency and simplification in principle.

Another object of the present invention to provide an automated test apparatus for risk and integrity testing of pharmaceutical filtration membranes for filtering medicine while monitoring whether its steep drop exists in filtration pressure. It has sufficient evidences to prove that the level of damage probability of the filter membrane in the filtration process is properly controlled, and after the completion of filtration, the membrane integrity test is performed. The pre-use post sterilization integrity test (PUPSIT) and post-filtration integrity test are also considered in the present invention in order to achieve the requirements of risk assessment and good manufacture practice (GMP) regulation.

Another object of the present invention is to accomplish a sterility assurance in an automatic manner, including membrane risk test, membrane integrity test, as well as a device isolating process. In accordance with the sterile filter membrane specification, the membrane risk test is conducted and completed in process to justify the integrity of then used filter and confirm immediately after use with an automated method for bubble point pressure test, wherein the flow lines and bottle sets were sterilized or cleaned with procedures in line with GMP requirements. The present invention uses computer implemented automation to replace traditional manual method to achieve the risk control that couldn't be done previously. The control method of the present invention can effectively obviate the complexity in pharmaceutical production, and address the issue of personnel radioactive exposure and the likes, and in compliance with current economic efficacy.

Another object of the present invention is to provide an automated test apparatus for risk and integrity testing of pharmaceutical filtration membranes, which is capable of conducting an independent operation for filter membrane testing and connecting with other automation modules to carry out on-line filter membrane testing.

To achieve the above objects, the technical features of the automated test apparatus for risk and integrity testing of pharmaceutical filtration membrane of the present invention comprising a liquid inlet, a pump, a fluid pressure gauge, a gas pressure gauge, a plurality of solenoid valves, a plurality of membranes, a gas pressure regulating valve, a bottle of pharmaceutical product, and a bottle of bubble generation. The present invention is controlled by computer software and connected with a pharmaceutical automatic synthesis device for automatic testing operation. To use the automated test apparatus for risk and integrity testing of pharmaceutical filtration membrane of the present invention, when the pharmaceutical synthesis is completed, it only needs to start the operation system of the automated test apparatus, one can complete filter membrane risk and integrity testing in a short time to provide important references for pharmaceutical quality assessment.

As aforementioned, the automated test apparatus for risk and integrity testing of pharmaceutical filtration membrane of the present invention can be operated independently or in connection with other automation modules for online filter membranes testing.

The technical features of the automated test apparatus for risk and integrity testing of pharmaceutical filtration membrane of the present invention comprising:
1. Risk testing by gas, comprising at least the following steps:
Step S11: passing nitrogen or an inert gas of 5 psi gauge pressure through a membrane disposed in a dried state;
Step S12: conveying nitrogen or inert gas into bubble bottles through a solenoid valve to observe conditions of bubble generation.
2. Risk testing by liquid, comprising at least the following steps:
Step S21: passing pharmaceutical product through a membrane for filtration with nitrogen or an inert gas of 20~25 psi gauge pressure;
Step S22: collecting the pharmaceutical product in a pharmaceutical vial after the filtration;
Step S23: passing gas through the membrane in moist state and checking the gauge pressure if it is maintained at the same pressure as that of step S21 or plunged in a range of 5~12 psi to determine if holes exist in the membrane.
3. Integrity test by gas, comprising at least the following steps:
Step S31: passing nitrogen or an inert gas of 20~25 psi gauge pressure through a membrane;
Step S32: checking the gauge pressure if it is maintained at the same pressure as that of step S31 or plunged in a range of 5~12 psi to determine the integrity of the membrane after production.

The above and other objects, features and advantages of the present invention will become apparent from the following detailed description taken with the accompanying drawings.

DETAILED DESCRIPTION OF THE PREFERRED EMBODIMENT

Figure 1:
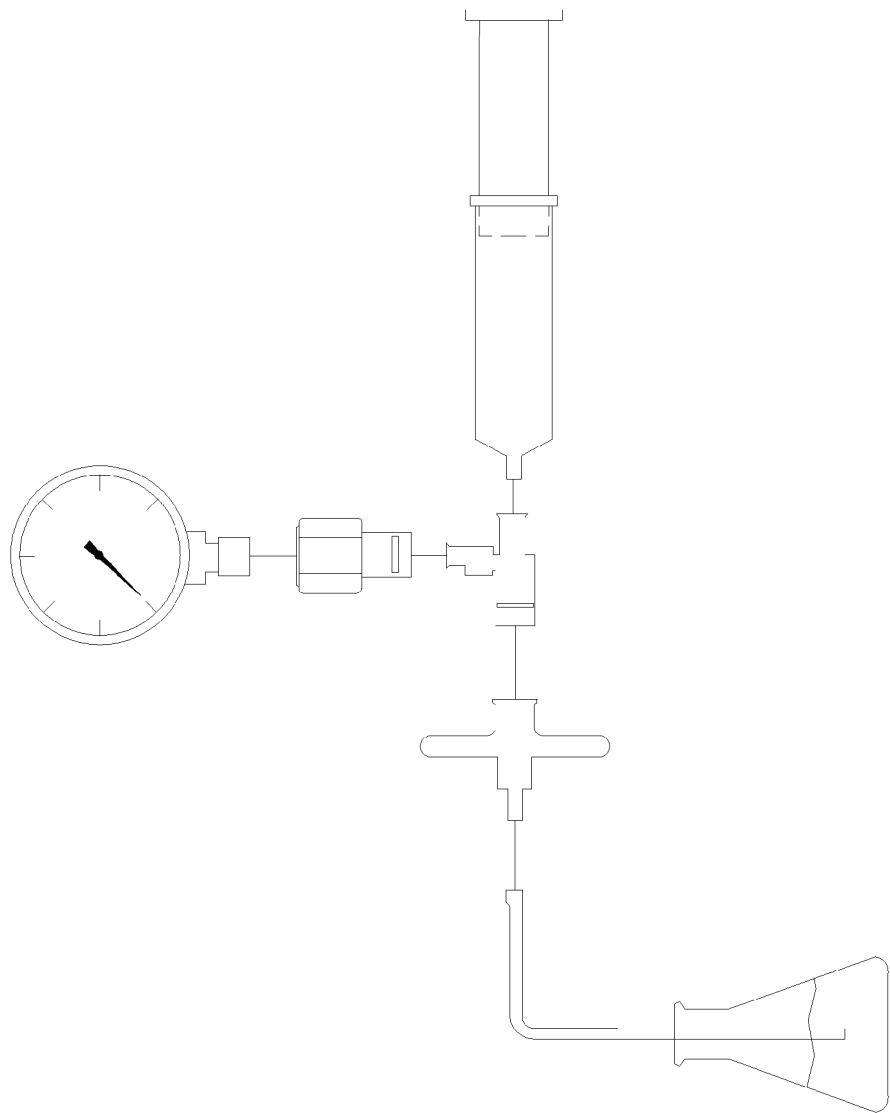
FIG. 1 shows a schematic diagram of integrity testing of a membrane in a prior art.

FIG. 1 is a prior art of integrity testing of a membrane with drawbacks as aforementioned and will not be reiterated herewith.

Figure 2:
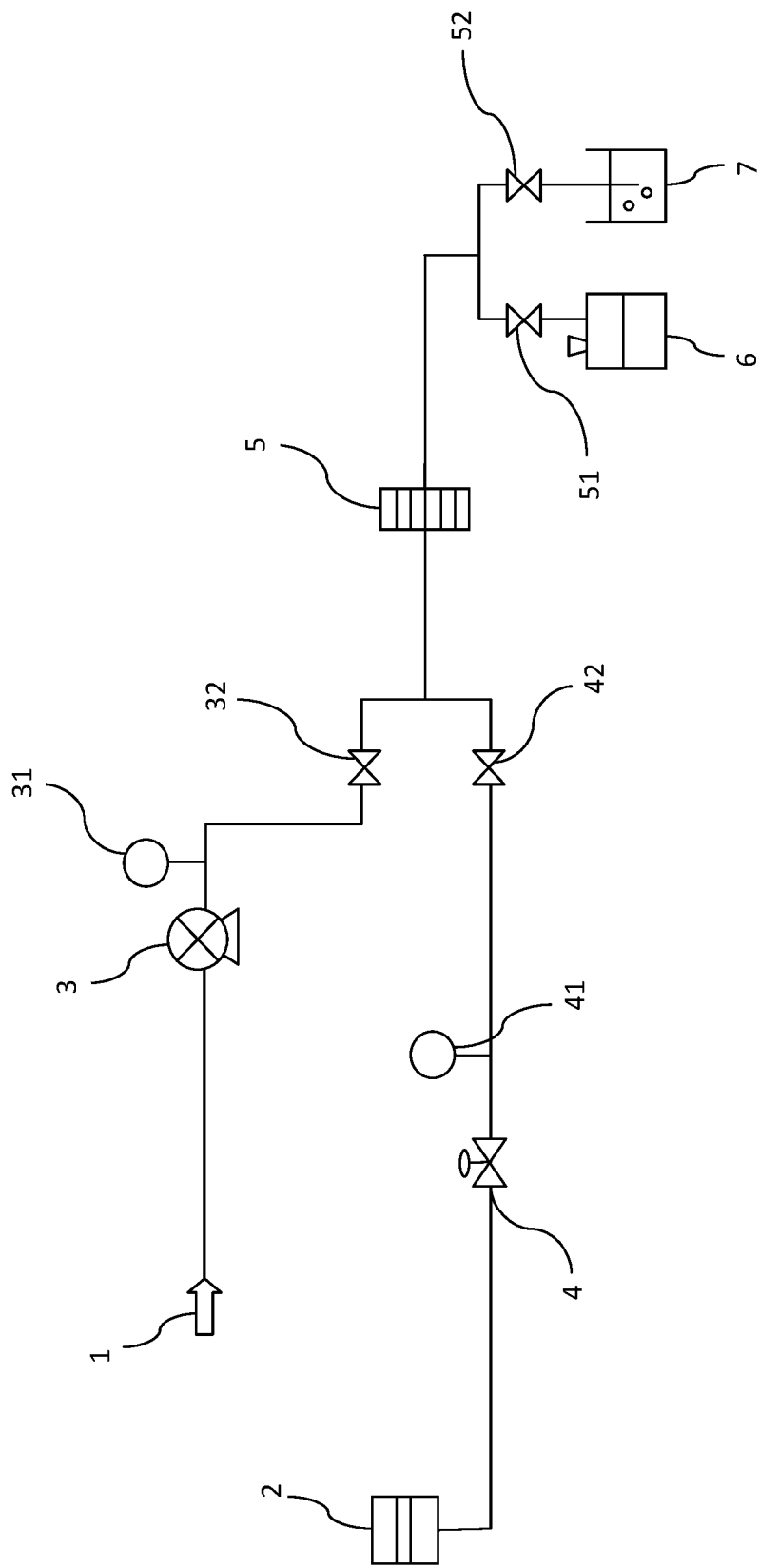
FIG. 2 shows a schematic diagram of an automated test apparatus for risk and integrity testing of pharmaceutical filtration membrane of the present invention.

FIG. 2 is a schematic diagram of an automated test apparatus for risk and integrity testing of pharmaceutical filtration membrane of the present invention. The apparatus at least comprises: a liquid injection port 1 for injecting a liquid reagent; a pump 3 for feeding the liquid reagent; a gas compressor 2 for conveying gases needed for risk and integrity testing into the membrane; a fluid pressure gauge 31 for testing reagents; a first input solenoid valve 32 for passing the liquid reagent through the membrane 5; a gas pressure regulator valve 4 for regulating gas pressure for membrane risk and integrity testing; a gas pressure gauge 41 for testing gas pressure of membrane risk and integrity testing, a second input solenoid valve 42 for passing gas through the membrane 5; a plurality of filtration membrane 5 for filtering the liquid reagent and testing gas; a first output solenoid valve 51 for output of the liquid reagent after filtration; a second output solenoid valve 52 for output of testing gas for membrane risk and integrity testing; a pharmaceutical product bottle 6 for receiving injection of the liquid reagent after filtration; a bubble bottle 7 for observing bubble generated for membrane integrity testing. In one of the preferred embodiment of the present invention, the membrane 5 uses 0.22 um membrane.

Figure 3:
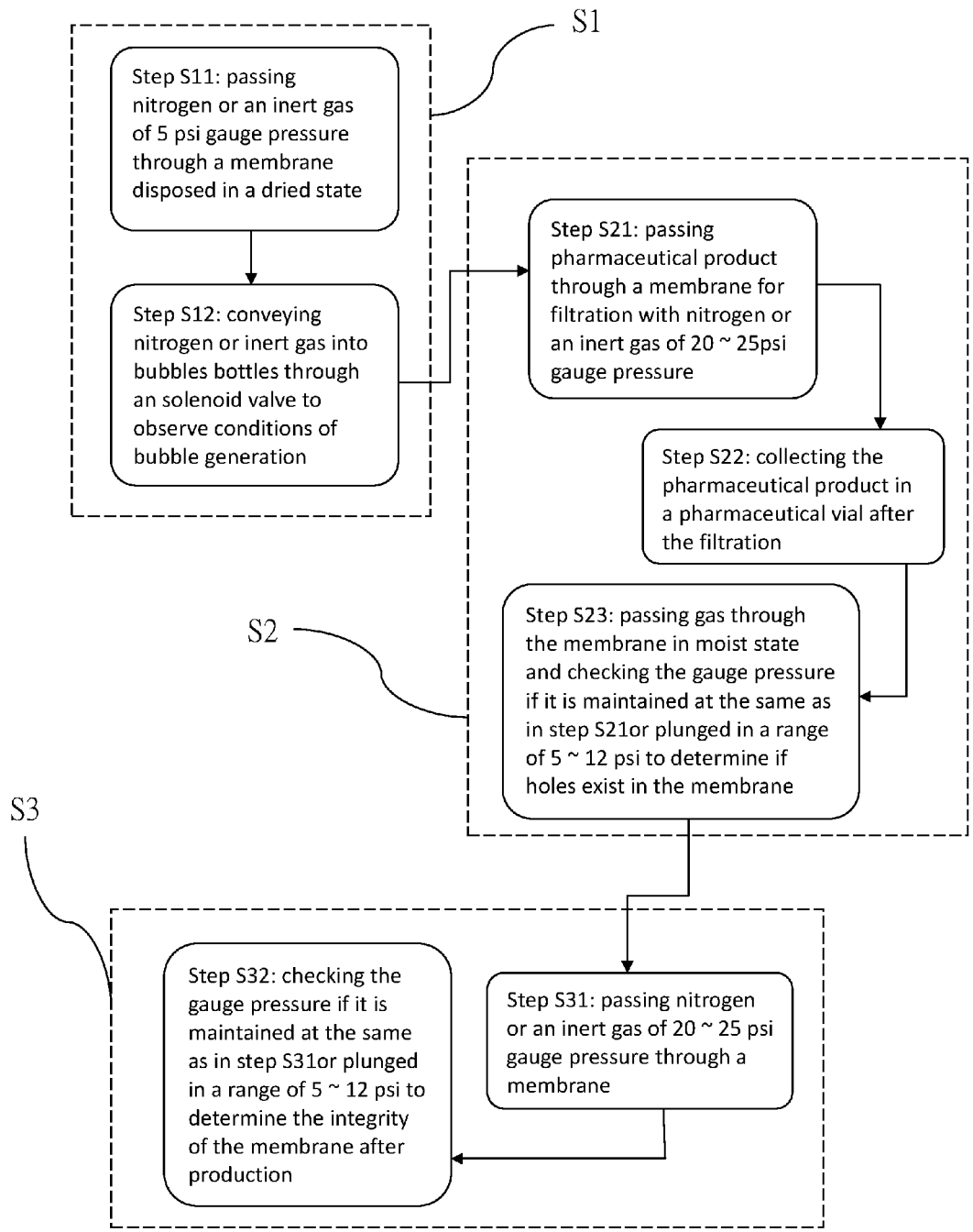
FIG. 3 shows an operational flow diagram of an automated test apparatus for risk and integrity testing of pharmaceutical filtration membrane of the present invention.

FIG. 3 shows an operation flow diagram of an automated test apparatus for risk and integrity testing of pharmaceutical filtration membrane of the present invention, in which, (1) the risk testing by gas for the filtration membrane of the present invention S1 including at least Step S11: with first input solenoid valve 32 inactivated and second input solenoid valve 42 activated, conveying nitrogen or an inert gas of 5 psi via gas pressure gauge 41 through the filtration membrane 5 disposed in a dried state; Step S12: with first output solenoid valve 51 inactivated and second output solenoid valve 52 activated, conveying the nitrogen or inert gas into bubble bottle 7 to observe conditions of bubble generation, and (2) the risk testing by liquid for the filtration membrane of the present invention S2 including at least Step S21: with first input solenoid valve 32 activated and second input solenoid valve 42 inactivated, conveying nitrogen or an inert gas in a range of 20-25 psi gauge pressure via fluid pressure gauge 31 through the filtration membrane 5; S22: with first output solenoid valve 51 activated and solenoid valve 52 inactivated, collecting pharmaceutical product after filtration through membrane 5 in bottle 6; S23: passing gas through the filtration membrane 5 in moist state and checking the pressure gauge 41, if it is maintained in a range of 20~25 psi, it indicates no holes exist, or plunged in a range of 5~12 psi, it indicates holes exist, for determination of the risk of the filtration membrane.

When the two risk tests abovementioned were completed, it proceeds to (3) the filtration integrity testing S3 including at least: Step S31: with first input solenoid valve 32 inactivated and second input solenoid valve 42 activated, conveying nitrogen or an inert gas in a range of 20~25 psi gauge pressure via fluid pressure gauge 31 through the filtration membrane 5; Step S32: with first output solenoid valve 51 inactivated and solenoid valve 52 activated, conveying nitrogen gas into the bubble generation bottle 7, observing condition of bubble generation and checking gas pressure gauge 41, if it is maintained in a range of 20~25 psi, it indicates the integrity testing of the filtration 5 after the production of pharmaceutical is acceptable, or unacceptable if it is plunged in a range of 5~12 psi.

In one preferred embodiment of the present invention, when the membrane 5 is dry, the exerting pressure is subject to air pressure gauge of about 5 psi.

In one preferred embodiment of the present invention, when the membrane 5 is wet and having holes, the exerting pressure is subject to the air pressure gauge in a range about 5~12 psi.

In one preferred embodiment of the present invention, when the membrane 5 is wet and in integrity having no holes, the exerting pressure is subject to the air pressure gauge in a range about 20~25 psi.

From the above it is understood that the automated test apparatus for risk and integrity testing of pharmaceutical filtration membrane of the present invention can improve production efficiency, simplify operational processes, reduce the risk of contamination with radioactive pharmaceuticals, and resolve issues of personnel exposure of radioactive dose.

The foregoing invention has been described in detail by way of illustration and example for purposes of clarity and understanding. It will be apparent to those of ordinary skill in the art that variations, changes, modifications and alterations may be applied to the compositions and/or methods described herein without departing from the true spirit, concept and scope of the invention.

What is claimed is:

1. An automated test method for risk and integrity of a pharmaceutical filtration membrane comprising:
    (1) risk testing by gas, comprising the following steps:
        Step S11: passing nitrogen or an inert gas of 5 psi gauge pressure through the pharmaceutical filtration membrane disposed in a dried state;
        Step S12: conveying nitrogen or inert gas into bubble bottles through a solenoid valve to observe conditions of bubble generation;
    (2) risk testing by liquid, comprising at least the following steps:
        Step S21: passing a pharmaceutical product through the pharmaceutical filtration membrane for filtration with nitrogen or an inert gas in a range of 20-25 psi gauge pressure;
        Step S22: collecting the pharmaceutical product in a pharmaceutical vial after the filtration;
        Step S23: passing nitrogen or an inert gas through the membrane in a moist state and checking the gauge pressure and, if it has remained the same as in step S21, it is determined that no hole exists, and if it is now in a range of 5-12 psi, it is determined that a hole exists in the pharmaceutical filtration membrane;
    (3) integrity test by gas, comprising at least the following steps:
        Step S31: passing nitrogen or an inert gas of 20-25 psi gauge pressure through the pharmaceutical filtration membrane;
        Step S32: checking the gauge pressure to determine if it has remained the same as in step S31 or it is now in a range of 5-12 psi to determine the integrity of the pharmaceutical filtration membrane after production.

2. The automated test method for risk and integrity of the pharmaceutical filtration membrane of claim 1, wherein the pharmaceutical filtration membrane in step S11 is dry and subject to a gauge pressure of 5 psi.

3. The automated test method for risk and integrity of the pharmaceutical filtration membrane of claim 2, wherein the gas is nitrogen or an inert gas.

* * * * *